(No Model.) 2 Sheets—Sheet 1.

B. F. MURPHY.
ROTARY STEAM ENGINE.

No. 601,158. Patented Mar. 22, 1898.

Witnesses
Harry W. Hahn
Victor J. Evans

Inventor
Benjamin F. Murphy

By John Wedderburn. Attorney

THE NORRIS PETERS CO., PHOTO-LITHO., WASHINGTON, D. C.

(No Model.) 2 Sheets—Sheet 2.

B. F. MURPHY.
ROTARY STEAM ENGINE.

No. 601,158. Patented Mar. 22, 1898.

Witnesses
Harry W. Hahn
Victor J. Evans

Inventor
Benjamin F. Murphy.

By John Wedderburn, Attorney

UNITED STATES PATENT OFFICE.

BENJAMIN F. MURPHY, OF BURLINGTON, MISSOURI.

ROTARY STEAM-ENGINE.

SPECIFICATION forming part of Letters Patent No. 601,158, dated March 22, 1898.

Application filed May 15, 1897. Serial No. 636,698. (No model.)

*To all whom it may concern:*

Be it known that I, BENJAMIN F. MURPHY, of Burlington, in the county of Boone and State of Missouri, have invented certain new and useful Improvements in Rotary Steam-Engines; and I do hereby declare the following to be a full, clear, and exact description of the invention, such as will enable others skilled in the art to which it appertains to make and use the same.

This invention relates to improvements in steam-engines of the rotary type.

The invention consists of certain novel features of construction, combinations, and arrangements of parts, all of which will be hereinafter more particularly set forth and claimed.

Figure 1:
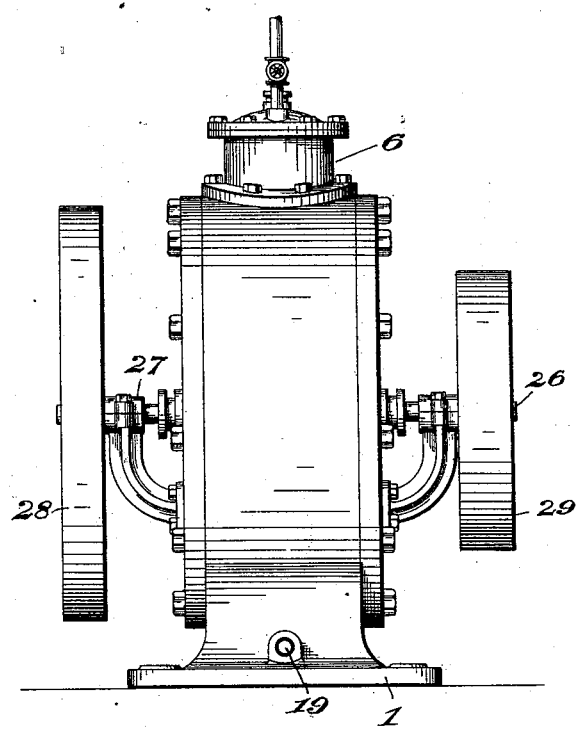
Figure 2:
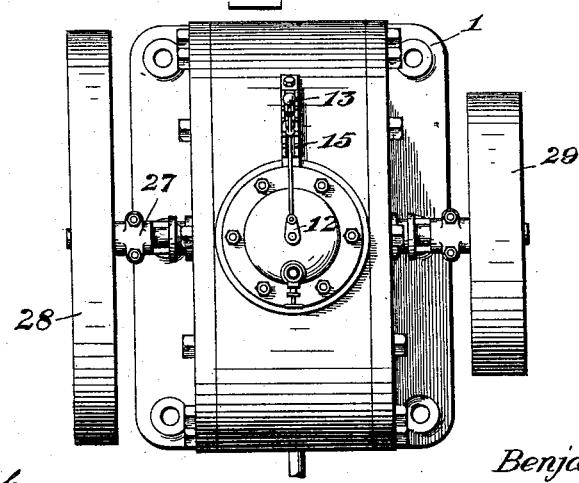
Figure 3:
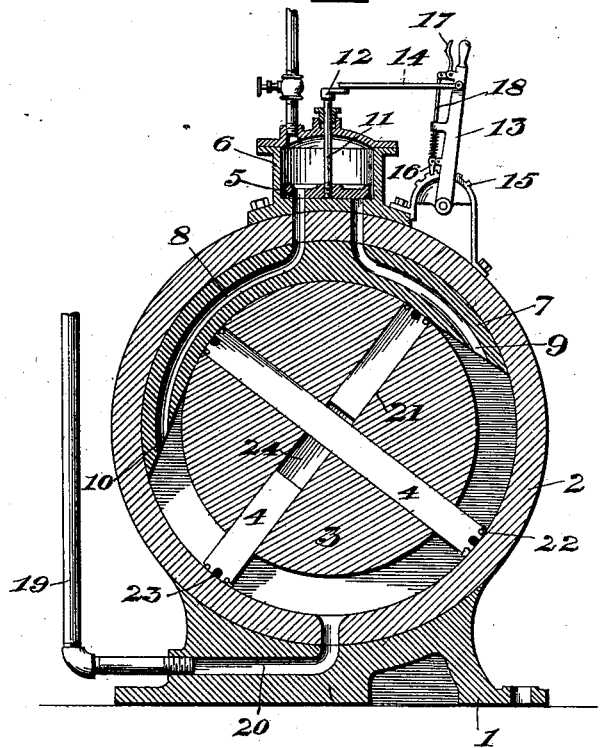
Figure 4:
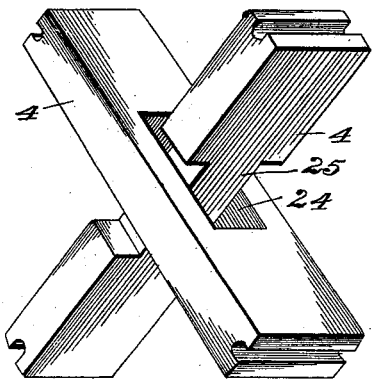

In the accompanying drawings, forming part of this specification, Figure 1 represents an end elevation of the engine embodying my invention. Fig. 2 represents a top plan view of the same. Fig. 3 represents a central vertical longitudinal section through said engine, and Fig. 4 represents an enlarged detail perspective view of the two sliding plates or wings and their mode of connection.

1 in the drawings represents the base of my improved engine; 2, the cylindrical casing; 3, the rotary piston; 4 4, the sliding wings or blades, and 5 the valve-disk. Said casing 2 is cylindrical in formation and is rigidly secured upon the upper concaved side of the base 1. This casing is provided upon its upper side with a valve-casing 6, suitably secured thereto. The interior of said casing 2 is formed with an abutment or enlargement 7, adapted to fill a portion of the space between the interior of said casing and the periphery of the piston. Inlet-passages 8 and 9, respectively, are formed in the casing 2 and this enlargement 7, so as to discharge at the opposite inclined ends 10 of the latter.

These passages 8 and 9 open into the steam-chest 6 and are adapted to be alternately uncovered by the rotary disk-valve 5. This disk-valve is provided with a vertical spindle 11, which passes upward and has a suitable packing-gland at the top of the steam-chest and is provided at its outer end with a laterally-projecting arm 12. This arm 12 is connected to a pivoted lever 13, mounted upon the casing 2 by means of a pivoted plate 14. Said lever 13 is adapted to travel over a segmental rack 15, also secured to the casing 2, and is provided with a spring-pressed pawl 16, adapted to engage said rack and hold said lever in any of its adjusted positions. This pawl 16 is operated by a pivoted finger-lever 17 and a connecting-link 18.

It will be observed from the foregoing description that by moving the lever 13 back and forth the disk-valve 5 will be rotated so as to bring either one or the other of the parts located therein in alinement with the parts of the passages 8 and 9. By this means the steam is thrown from the steam-chest into either of the passages 8 and 9, and the engine may thus be instantly reversed when so desired. An exhaust-pipe 19 is connected to an exhaust-passage 20, formed through the base 1 and opening into the lower portion of the cylindrical casing 2. The piston 3 is mounted concentrically within the casing 2 and is provided with diametrically-arranged slots or passages 21, in which the sliding wings or blades 4 are mounted. Each of these wings or blades is of greater length than the diameter of the piston, so that one end of the same must always project from the periphery of said piston. In order to relieve the excessive friction that may occur between the outer ends of said wings and the inner walls of the casing 2 and the enlargement 7, I provide said ends with antifriction-rollers 22, suitably set in sockets formed in said ends. I also provide said ends with packing-strips 23, so that steam-tight joints are formed between them and the interior wall of the casing. One of said wings 4 is provided at its middle with a slot 24, through which the reduced portion 25 of the opposite wing passes. By this construction said wings may slide by one another without in any wise interfering.

It will be observed from the foregoing description that as the piston 3 rotates the projecting end of the wing upon one side will strike one of the inclined ends of the enlargement 7 and will thus force the wing through the piston, so as to project its opposite end. By this means the projecting end of the wing is forced into the piston shortly after it has passed the exhaust and again forced out into the path of the live steam after it has passed the inlet. This is the case no matter in which direction the engine is moving, as the inclines 10 10 engage said projecting ends and positively force them into the piston, with the consequence that the opposite ends are projected upon the opposite side of the piston. Said piston 3 is mounted upon a suitable shaft 26, which is journaled in brackets 27, mounted upon the casing 2. One end of said shaft is provided with a balance-wheel 28 on the opposite end and carries a belt-wheel 29, by means of which the power of my improved engine is communicated to any machinery desired.

By the peculiar construction of my engine the same may be instantly reversed when so desired and will run equally well in either direction. The construction and operation of the several parts are very simple and cheap and the absence of all springs in my improved construction renders the engine less liable to injury and displacement. The operation of the respective wings or blades is positive, but at the same time attended with but very little friction, as the antifriction-rollers located at the respective opposite ends of said wings reduces the friction to a minimum.

Having thus described the invention, what is claimed as new is—

The combination with a casing provided with an abutment extending along a portion of its interior and having inclined ends and oppositely-extending steam-passages leading from the steam-chest to the ends of said abutment, of a rotary piston mounted in said casing, sliding wings extending diametrically through said piston so as to be alternately projected upon opposite sides of the same by engagement with the ends of said enlargement, a pair of antifriction-rollers mounted in each end of each wing, one at each corner thereof, a packing-strip set into the extremity of each wing between each pair of rollers, an exhaust-pipe opening into the lower portion of said casing, and a valve for throwing the steam to one or the other end of said enlargement for reversing the engine at will, substantially as described.

In testimony whereof I have signed this specification in the presence of two subscribing witnesses.

BENJAMIN F. MURPHY.

Witnesses:
J. N. SHIPPEN,
JAMES PILCHER.